United States Patent [19]

Bullard et al.

[11] 4,349,233

[45] Sep. 14, 1982

[54] METHOD AND APPARATUS FOR CONTROLLING WHEEL SLIP ON DIFFERENTIALLY MOUNTED WHEELS

[75] Inventors: David E. Bullard, Washington; Allen D. Myers, Decatur, both of Ill.

[73] Assignee: Caterpillar Tractor Co., Peoria, Ill.

[21] Appl. No.: 245,231

[22] PCT Filed: May 7, 1980

[86] PCT No.: PCT/US80/00538

§ 371 Date: May 7, 1980

§ 102(e) Date: May 7, 1980

[87] PCT Pub. No.: WO81/03151

PCT Pub. Date: Nov. 12, 1981

[51] Int. Cl.³ .............................................. B60T 8/02
[52] U.S. Cl. ........................................ 303/96; 303/71; 303/98; 180/197
[58] Field of Search ................. 180/196, 197; 74/711; 188/106 F, 170, 181 A, 354; 303/2-4, 6 M, 6 R, 6 A, 9, 13-17, 91, 93-109, 113-119, 71, 89; 244/111

[56] References Cited

U.S. PATENT DOCUMENTS

| | | |
|---|---|---|
| 3,025,722 | 3/1962 | Eger, Jr. et al. ........................ 74/711 |
| 3,779,331 | 12/1973 | Burkhardt et al. ..................... 303/96 |
| 3,901,556 | 8/1975 | Prillinger et al. .............. 303/6 R X |
| 3,927,737 | 12/1975 | Prillinger et al. ............... 188/106 F |
| 3,944,295 | 3/1976 | Lloyd et al. ........................... 303/89 |
| 3,981,545 | 9/1976 | Eddy ..................................... 303/96 |
| 4,006,939 | 2/1977 | Schexhayder ......................... 303/71 |
| 4,066,300 | 1/1978 | Devlin .................................. 303/96 |
| 4,156,547 | 5/1979 | Marsh .................................... 303/96 |
| 4,180,223 | 12/1979 | Amberg ............................... 244/111 |

OTHER PUBLICATIONS

"Traction Control Prevents Spin-Out", *Automotive Engineering*, Sep. 1975, pp. 8, 10.

*Primary Examiner*—Douglas C. Butler
*Attorney, Agent, or Firm*—Phillips, Moore, Weissenberger, Lempio & Majestic

[57] ABSTRACT

A standard motor vehicle having a pair of driving wheels (8), (9) powered by a drive shaft (10) through a differential (11) can experience difficulties when one of the two differentially driven wheels (8/9) loses traction. The differential (11) directs all of the power to the wheel that is slipping and the wheel with traction remains stationary. Various anti-spin devices have been developed but these often produce an abrupt transfer of all of the driving power to the wheel having traction. The anti-spin apparatus of this invention overcomes this problem and includes an electrical control circuit (24) and sensors (20), (21) for generating a slip signal representing the speed difference between the wheels (8), (9). The apparatus further includes a modulated hydraulic reducing valve (30), (110) for actuating the brake (15/15') on the faster rotating wheel (8/9) and a hydraulic modulating control valve (29) connected to the reducing valve (30), (110) and actuated by the slip signal. The reducing valve (30), (110) is modulated to proportionally vary the braking force applied to the faster rotating wheel in accordance with the difference in rotational speeds between the wheels (8), (9).

12 Claims, 9 Drawing Figures

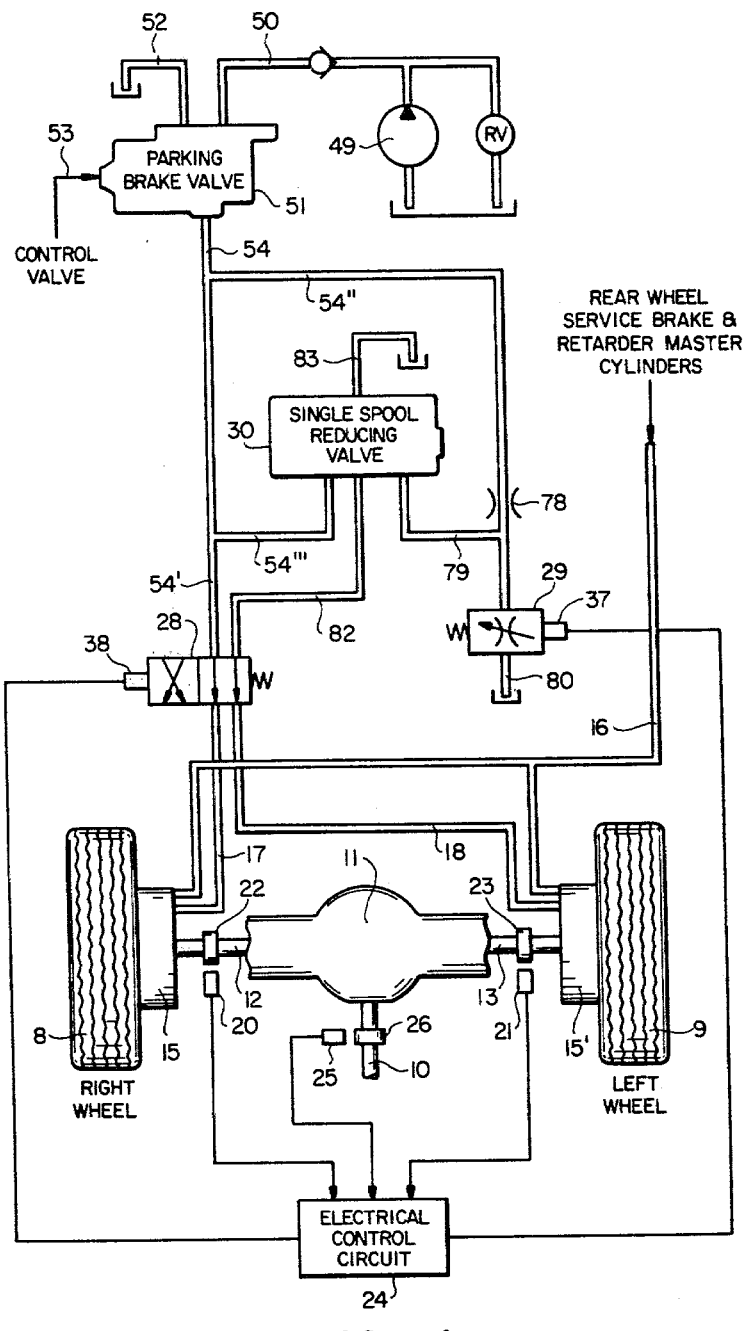
FIG_1

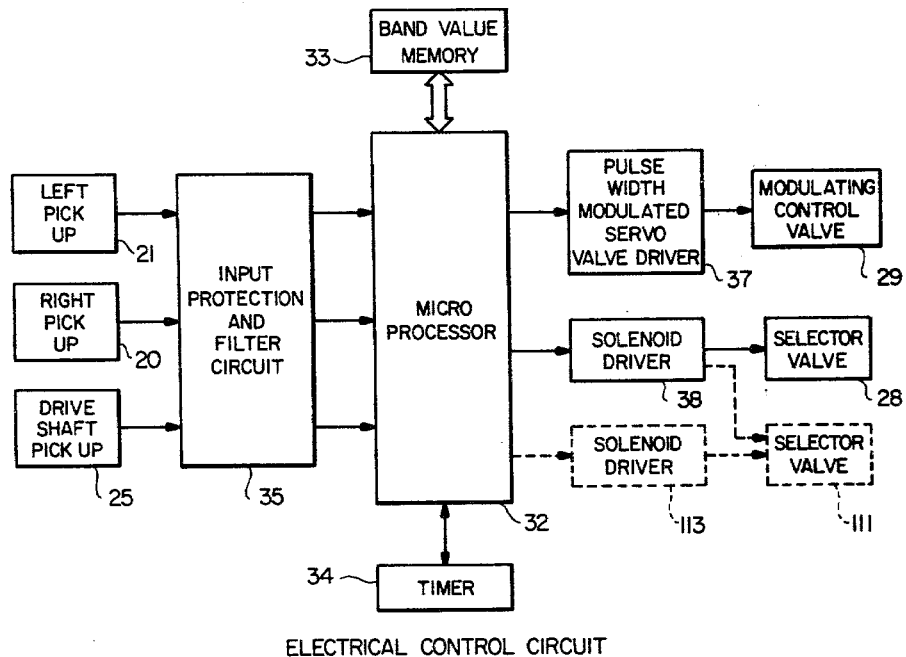
ELECTRICAL CONTROL CIRCUIT
FIG_2
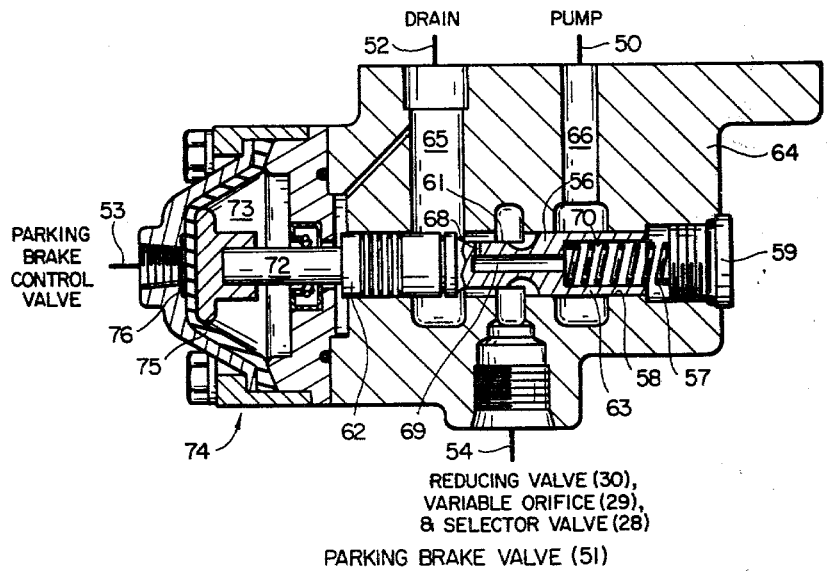
PARKING BRAKE VALVE (51)
FIG_3

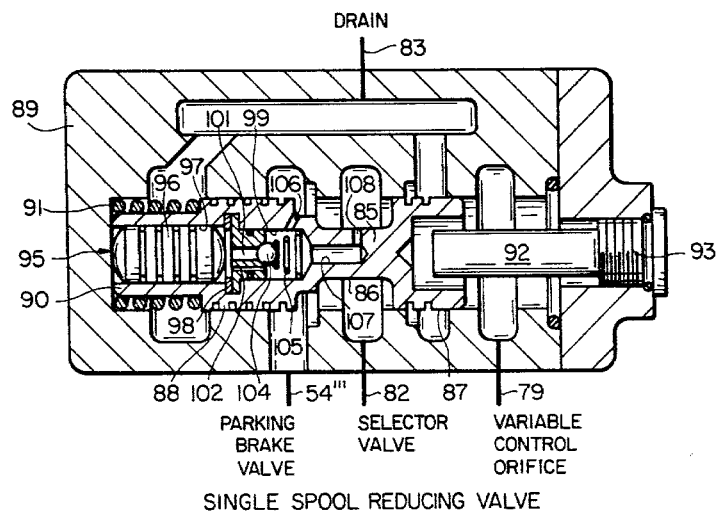
FIG_4
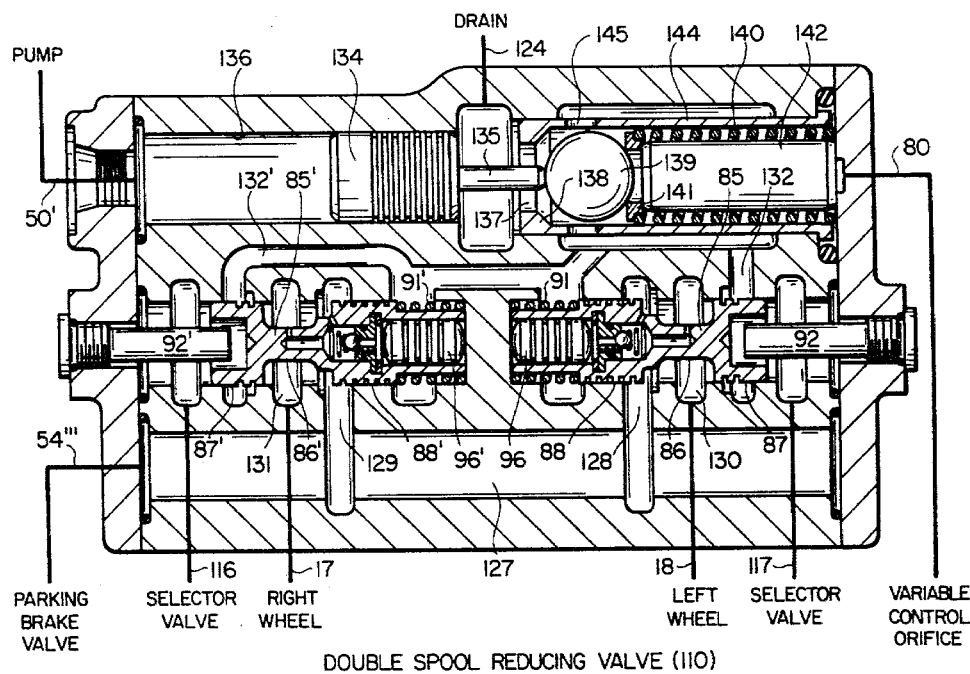
FIG_5

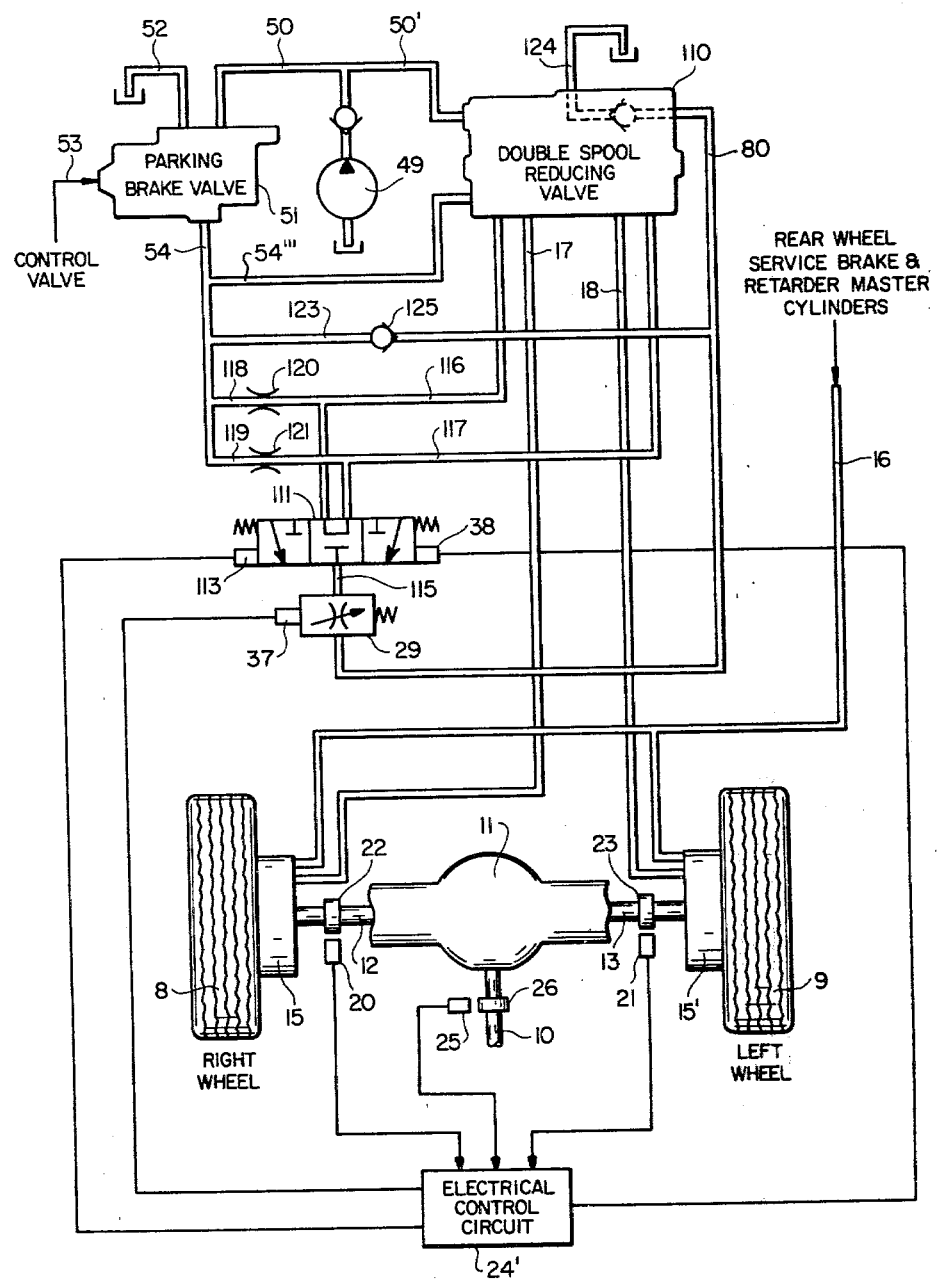
FIG_6

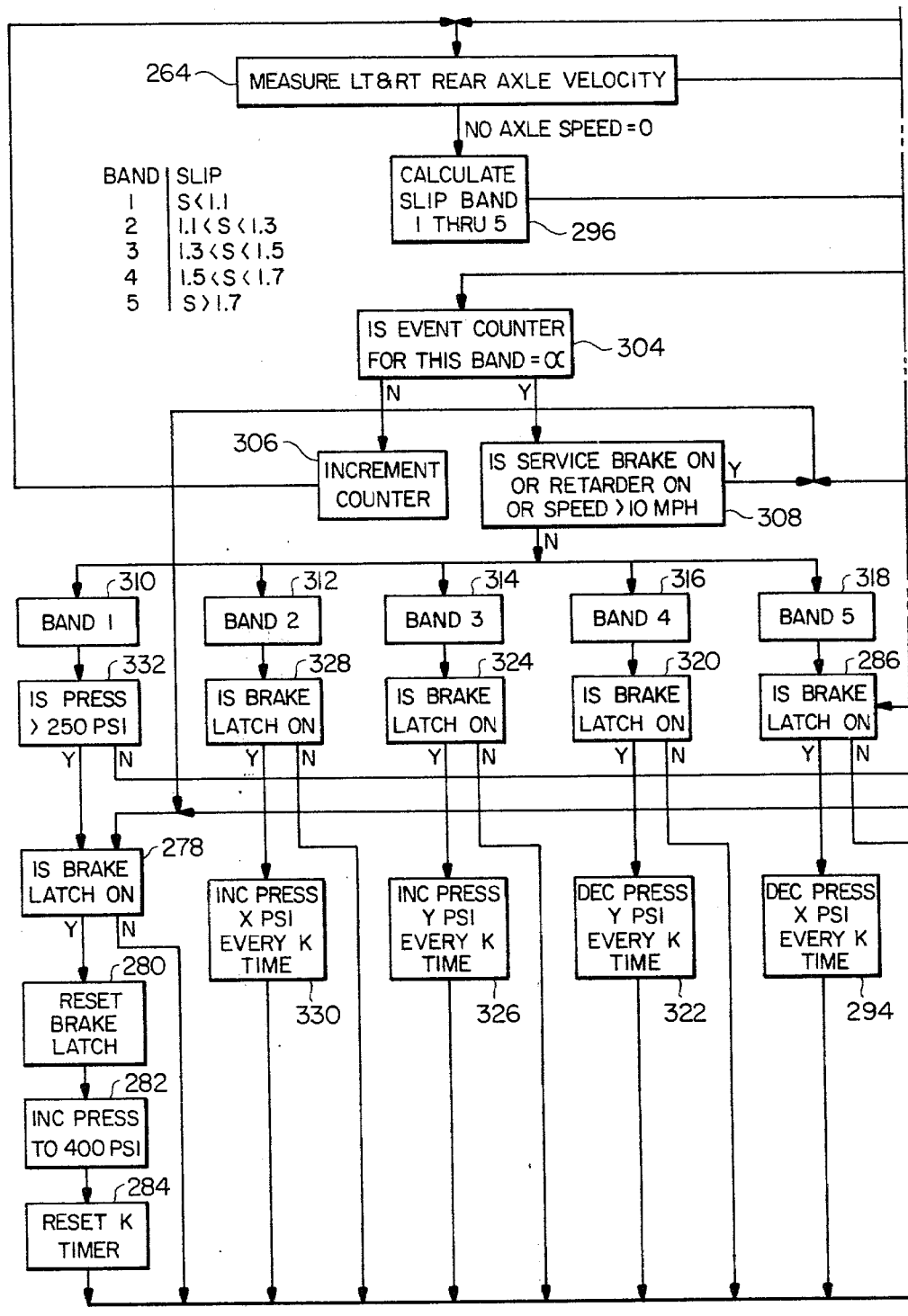
FIG_7A

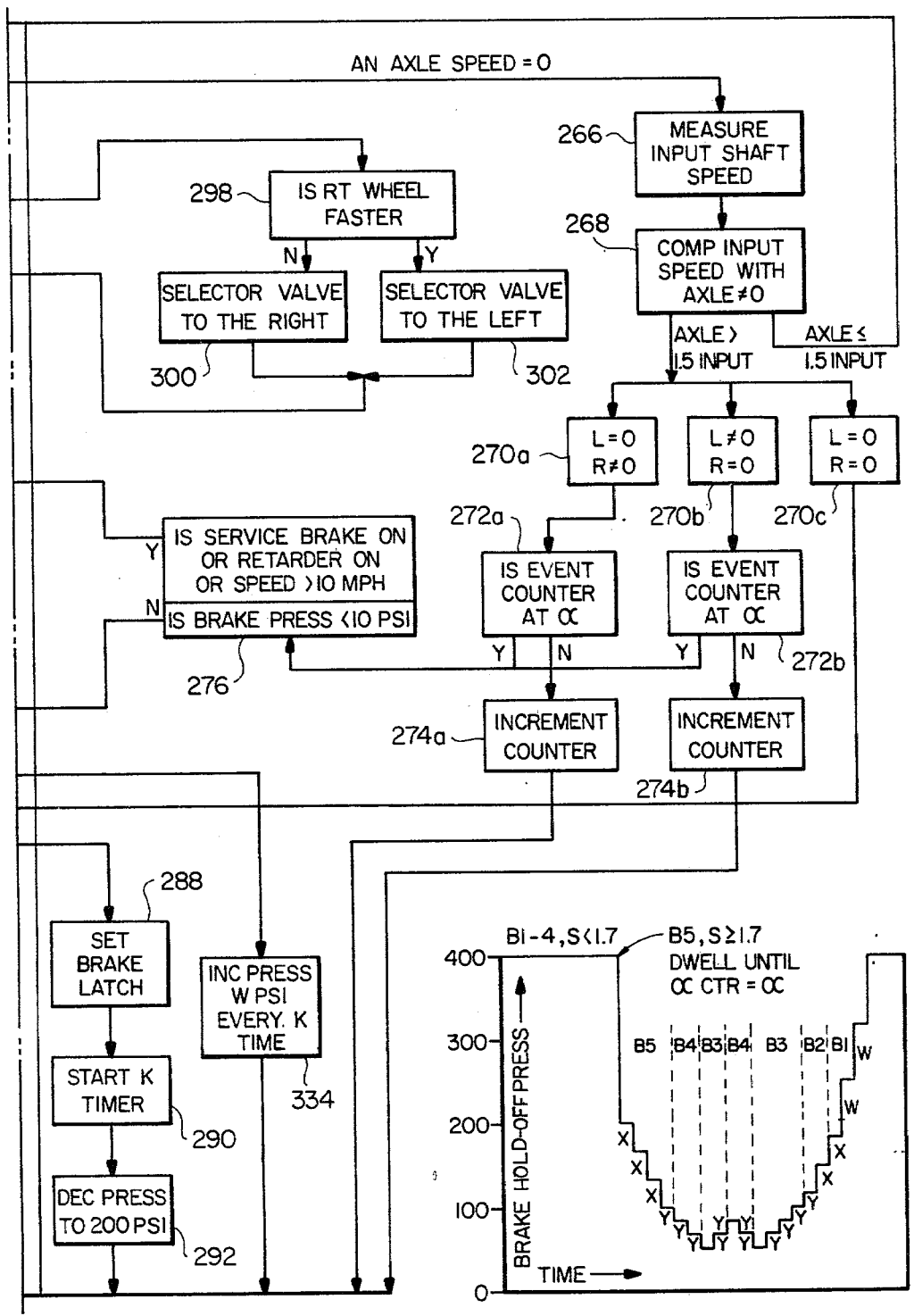

METHOD AND APPARATUS FOR CONTROLLING WHEEL SLIP ON DIFFERENTIALLY MOUNTED WHEELS

DESCRIPTION

1. Technical Field

This invention relates to vehicle drive systems having wheels which are driven through a differential and, more particularly, to a method and apparatus for controlling wheel slip between differentially driven wheels due to a loss of traction by one of the wheels.

2. Background Art

A standard vehicle having a pair of driving wheels powered by a drive shaft through a differential can experience difficulties when one of the two differentially driven wheels loses traction. This can occur, for example, when a truck gets one of its drive wheels stuck in the mud. The other wheel may be on solid ground and have good traction, but the vehicle is often unable to move. The differential directs all of the power to the wheel in the mud and the wheel with traction remains stationary. The conditions which give rise to such a loss of traction commonly exist around construction sites, off-road locations, and during wet, snowy or icy weather conditions.

To alleviate this loss of traction condition, various mechanical anti-spin devices have been developed and put into commercial use. These devices, however, often produce an abrupt transfer of all of the driving power to the wheel or wheels having traction. This abrupt and full transfer of power can create such large mechanical stresses on the drive train that its useful life is shortened.

An alternative approach to the problem of slip involves the use of separately actuable wheel brakes. An operator using such a system can selectively apply a braking force to the spinning wheel and thus can balance the power from the drive shaft between the slipping and non-slipping wheels. The application of such a braking force simulates traction and results in a more even distribution of power between the wheels. These systems, however, are easily abused and can cause unacceptable wear on the drive train.

Automatic slip control systems using selectively actuable wheel brake systems are also well known. These systems include speed sensors located on or near each of the driven wheels for generating wheel speed signals, means for comparing the signals, and solenoid operated valves which actuate the wheel brake of the slipping wheel whenever a slip condition is detected.

One such automatic system is disclosed in U.S. Pat. No. 4,066,300 to Devlin, issued Jan. 3, 1978. Other similar systems are disclosed in U.S. Pat. No. 3,025,722 to Eger, Jr., issued Mar. 20, 1962 and in U.S. Pat. No. 3,981,545 to Eddy, issued Sept. 21, 1976. The Eddy system utilizes speed sensors for generating a velocity signal for each driven wheel, comparison means for determining when the rotational velocity of one wheel exceeds that of the other, and hydraulic valves to apply a braking force to the faster driven wheel.

All of the automatic systems involve an abrupt application and release of brake forces to the slipping wheel. These approaches, unless utilized with very light braking forces and at low speeds, can lead to abrupt or jerky motion of the vehicle.

The present invention is directed to overcoming one or more of the problems as set forth above.

DISCLOSURE OF THE INVENTION

In one aspect of the invention, an apparatus is provided for automatically balancing the power transfer between two driven vehicle wheels when one of the wheels loses traction and rotates faster than the other. The apparatus applies a varying braking force to the wheel which lacks traction. The apparatus includes a pair of wheels, means for braking the wheels and means for generating a slip signal corresponding to any difference in the rotational speeds between the wheels. The apparatus further includes an improvement comprising means for actuating the brake on the faster rotating wheel in a manner proportional to the difference in rotational speeds between the wheels.

In a second aspect of the invention a method is provided for controlling wheel slip on driven wheels when one of the wheels loses traction and rotates faster than the other. The method involves the steps of sensing any difference in rotational speeds between the driven wheels; developing a slip signal in proportion to the difference; actuating the brake on the faster rotating wheel using a modulated valve; and modulating the valve by utilizing a control valve actuated by the slip signal.

The present invention solves the problem of too abruptly applying and releasing braking forces to a slipping wheel by utilizing a modulating control valve and a modulated actuating valve. The control valve moves a spool (or spools) in the actuating valve in a manner proportional to the difference in rotational speeds between wheels. The actuating valve in turn proportionally varies the application of the brake on the faster rotating wheel in a corresponding manner. The control valve continuously positions the spool in the actuating valve so that the braking force is continuously varied in a manner corresponding to the amount of slip that is occurring. Thus, the abrupt application and release of full braking force is eliminated.

BRIEF DESCRIPTION OF THE DRAWINGS

FIG. 1 is a schematic diagram of a vehicle drive system embodying an anti-slip control apparatus in accordance with an embodiment of the invention;

FIG. 2 is a block diagram of the electrical control circuit of FIG. 1;

FIG. 3 is a side elevational view in cross-section of the parking brake valve of FIG. 1;

FIG. 4 is a side elevational view in cross-section of the single spool reducing valve of FIG. 1;

FIG. 5 is a side elevational view in cross-section of the double spool reducing valve of FIG. 6;

FIG. 6 is a schematic diagram of a vehicle drive system embodying an alternative anti-slip control apparatus in accordance with an embodiment of the invention;

FIGS. 7A and 7B together are an operational flow chart from which programming for the microprocessor of FIG. 2 can be readily developed; and FIG. 8 is a graph of brake hold off pressure versus time and is utilized in describing the operation of the flow chart of FIGS. 7A and 7B.

BEST MODE FOR CARRYING OUT THE INVENTION

FIG. 1 illustrates one embodiment of the invention for controlling wheel slip on a motor vehicle having a pair of driven wheels. The apparatus includes a right drive wheel 8 and a left drive wheel 9 which are driven by a motor (not shown) through a drive shaft 10, a differential 11, and two half-axles 12, 13, respectively. The drive system, per se, is conventional and for brevity no details need be given.

The wheels 8, 9, FIG. 1, are stopped by a spring-engaged emergency/parking brake piston or hydraulically engaged service brake piston of brake 15, 15'. The brakes are spring biased so that when no hydraulic pressure is present, the emergency/parking brakes engage and stop the wheels. During operation of the vehicle the brakes are maintained in the disengaged position by fluid pressure as disclosed in U.S. Pat. No. 3,927,737 issued Dec. 23, 1975 to P. F. M. Prillinger and assigned to the assignee of this invention. The brakes are normally actuated via a service brake line 16 coming from the rear wheel service brake and retarder master cylinders (not shown). The service braking system, per se, is well known and does not form part of this invention. The brakes are also actuated through the parking/emergency brake lines 17, 18 as described in detail below.

Wheel slip is determined by sensing if there is any difference between the rotational speeds of the wheels 8,9, FIG. 1. The sensing apparatus includes a right wheel electromagnetic transducer 20 and a left wheel electromagnetic transducer 21. These transducers operate to provide pulses in cooperation with two gear-like devices, 22, 23 which are driven by half-axles 12, 13, which are mounted in axle housings for rotation therewith. Signals from the right wheel transducer 20 are applied to one input of an electrical control circuit 24. The details of this circuit are illustrated in FIG. 2 and are hereinafter described. Signals indicating the speed of the left wheel from transducer 21 are applied to a second input to the electrical control circuit 24. Further, a drive shaft speed signal is generated by a pickup 25 and a gear-like device 26 which rotates with the drive shaft 10. The drive shaft speed signals are applied to a third input of the electrical control circuit 24.

The electrical control circuit 24, FIG. 1, has two outputs which actuate the brake, 15 or 15', on the faster rotating wheel in a manner proportional to the difference in the rotational speeds between the wheels. The control circuit 24 operates upon the three signal inputs to determine the existence, magnitude and location of wheel slip during a loss of traction situation. The power transfer between the two differentially driven vehicle wheels 8, 9 is more effectively balanced by applying a braking force to the wheel which has lost traction in proportion to the amount that it is rotating faster than the other. The braking force is both proportionally increased and decreased as necessaary. The circuit also determines, by pressure switches in the air actuating lines to the master cylinders, not shown, if either the service brake or the retarder 16 is being used or if the vehicle is traveling more than a preselected speed, for example ten miles per hour. If any of these events is occurring, then the anti-slip system is disabled.

The control circuit 24 electrically actuates a selector valve 28 and a modulating control valve 29. The modulating control valve 29 modulates a reducing valve 30 to reduce (or to increase) the hydraulic pressure to the selected brake, 15 or 15'. The selector valve 28, which is actuated by the control circuit 24, connects the reducing valve 30 to the selected brake, 15 or 15', either through conduit 17 or conduit 18. These valves and their operation are described in detail below.

FIG. 2 illustrates the preferred implementation of the electronic control circuit 24 of FIG. 1. The circuit includes a solid state microprocessor 32 of the type available from such sources as Motorola and Fairchild and is utilized to perform the control functions of the apparatus. In particular, the microprocessor 32 establishes a plurality of slip value bands. Each band has a defined slip signal value, and each value has associated with it a rate at which a braking force is either applied or removed. The microprocessor 32 is readily programmed to respond to signals from the right, left and drive shaft pickups 20, 21, 25, respectively; to generate a slip signal proportional to the difference in rotational speeds between the driving wheels and to compare the slip signal to the limits of each of the bands. The microprocessor 32 thereby determines the particular band within which the slip signal resides at any given time. The microprocessor 32 is operatively interconnected with a band value memory 33 and a timer 34 which establishes a timing cycle for the circuit. The pickups or transducers 20, 21, 25 are connected through an input protection and filter circuit 35 which provides appropriately digitized input signals to the microprocessor 32.

For the embodiment of FIG. 1 the microprocessor 32, FIG. 2, has two outputs. The first output goes to a pulse width modulated servo valve driver 37. The valve driver 37 is connected to the modulating control valve 29 which has a variable control orifice. The second output from the microprocessor goes to a solenoid driver 38 which actuates the selector valve 28 which is of a two-position variety. A solenoid driver 113 and a selector valve 111, illustrated with phantom lines in FIG. 2, are utilized in the alternative embodiment of the apparatus illustrated in FIG. 6. It should be appreciated that the outputs to the drivers are represented in FIG. 1 as a single line for the purposes of simplicity.

The servo valve driver, 37, FIG. 2, includes a duty cycle generator in the form of a digital to pulse width converter (not shown) such as Motorola integrated circuit number 6840. An oscillator also forms part of driver 37 and is connected to the converter to provide a base frequency. The output of the duty cycle generator is a width modulated pulse train having a preselected frequency of, for example, 100 Hz. The output signal is applied to an amplifier (not shown) which increases the power of the signal. The signal is thereafter applied to a proportioning valve which also forms part of the driver 37. One such valve is the Fema Corporation of Portage, Michigan proportional controller model number 82. The proportioning valve is connected to the modulating control valve 29 to vent the pressure in conduit 79, FIG. 1 and thereby modulate the single spool reducing valve 30 as described below.

FIG. 7 illustrates a flow chart defining the internal programming for the microprocessor 32, FIG. 2, and the band value memory 33. From this flow chart, a programmer can develop a specific set of instructions for a general purpose microprocessor. The flow chart of FIG. 7 involves the definition and storage of speed differential or slip bands and the further definition of braking forces, expressed as brake fluid pressure increments, associated with a speed differential value for each band.

It is assumed that the vehicle on which the wheels 8, 9, FIG. 1 are mounted has a turning capability which, when employed to full effect, results in a maximum wheel speed differential of 1.5. A relatively high slip value threshold, for example, ($S \geq 1.7$) is set for entering into the slip control mode. This is done so that when the vehicle turns around a corner and a slip indication of 1.5 or less is sensed, the system does not unnecessarily enter one of the slip control modes. In particular, the conditions for entry into band 5 have not been met as described below. On the other hand, once the slip control mode has been entered via band 5, a new lower slip threshold is established so that the system will typically exit from the slip control mode through two or three incremental steps.

Three other factors play major roles in the operation of the system. First, a timing period is established whereby the slip value is periodically redetermined and, to the extent that it remains within a given band, a brake pressure increment, either positive or negative, is effected at the end of each clock time until the slip value moves into another band. Secondly, an indication of slip is always cross-checked by comparing the speed of the slipping wheel to the speed of the drive shaft 10, FIG. 1, so that the failure of one wheel speed transducer is not misinterpreted as a slip condition. A false zero speed indication from one of the wheel speed transducers is immediately recognized and the slip control system is disabled. Thirdly, the slip control mode is not entered if either the service brakes or retarder is being applied or if the vehicle is traveling faster than ten miles per hour. See program blocks 308, FIG. 7A.

Referring to FIGS. 7A and 7B, flow chart block 264 represents the sampling of data from the left and right wheel speed transducers 20, 21, FIG. 1. This data is stored by the microprocessor 32 for later retrieval and processing. As a first condition it is assumed that one of the axle speed signals is equal to zero. If this is the case, the routing progresses along the right side of the diagram, FIG. 7B. Block 266 represents the input signal from the drive shaft transducer 25. It is understood that this signal is also placed in predetermined storage location by the microprocessor 32.

Next, the drive shaft speed signal is compared with the non-zero wheel speed signal. Assuming a bevel gear ratio of 1:1, if the ratio of the wheel speed to the drive shaft speed is equal to or less than 1.5, it is assumed that the wheel showing zero speed is actually turning and the zero indication is the result of a transducer failure. The routine then calls for a return to the original input point. In addition, an output signal is generated which alerts the operator to the apparent failure of the transducer.

If the rotating wheel speed is calculated to be greater than 1.5 times the drive shaft speed, as indicated by comparison step 268, the program progresses to the evaluative step represented by flow chart blocks 270a, 270b, and 270c. If the condition represented by block 270a is satisfied, the program progresses to block 272a which represents an event counter requiring several successive cycles of positive signal conditions before the "brake latch" condition is begun. Brake latch is the activation of the slip control system. It has been found that a delay time α represented by several successive cycles is advisable in order to filter out short term aberrations in wheel speed condition. If the event counter has not reached the delay time α, the program progresses to block 274a which involves incrementing the counter. From this point the program returns to the original input condition.

If the condition represented by program block 270b is satisfied, the program progresses to blocks 272b and 274b. If either block 272a or 272b produces a positive signal condition, the program progresses to block 276 which involves a determination of the input signal switch conditions controlling the service brake, the retarder and/or the vehicle speed.

If the speed signal condition represented by block 270c is satisfied, the program advances to blocks 278, 280, 282, and 284 to release the parking brakes 15, 15', FIG. 1, and to reset the timer. The same result occurs if the output of program block 276 is positive.

If the output of program block 276 is negative, the program progresses to block 286 to determine whether the slip control is activated. If the result is positive, the program in effect enters band 5, block 318, and progresses to block 294. Band 5 is the most severe slip condition band. In block 294 the wheel brake force is increased by decreasing the wheel brake hold-off pressure by the pressure increment X for every timed interval established by the timer 34, FIG. 2. If program block 286 indicates that the spin control apparatus is not operative, the program progresses to block 288 which activates the system and thence through blocks 290 and 292 to begin the timing cycle and reduce brake hold-off pressure to a value just sufficient to maintain the brakes in the off position. On the next pass through the above sequence, a positive result will be obtained at block 286 and in block 294 brake hold-off pressure will be decreased by X psi. The control will continue to repeat this sequence at timed intervals until either the zero speed wheel starts to turn or else the brake hold-off pressure is decreased to nearly zero. In the latter case, the brakes are then released completely. In the former case, the control follows the path from block 264 to block 296 as described below.

If the result of calculation block 264 indicates that neither wheel 8, 9, FIG. 1 is stopped, the routine branches to block 296 which represents a calculation subroutine. In essence, the calculation subroutine involves determining the location of the actual slip value within the five bands represented by the small table shown in the upper left-hand side of FIG. 7A. The slip bands are contiguous. The upper limit of one band abuts the lower limit of the next band, and the highest slip value which is required for activation is 1.7.

Program blocks 298, 300 and 302 represent the determinations of which wheel is the faster rotating wheel and the proper position of the selector valve 28, FIG. 1. The selector valve 28 connects the reducing valve 30 and the modulated hydraulic pressure therefrom to the higher speed wheel. The selector valve 28 also connects the parking brake valve 51 and the unmodulated hydraulic pressure to the lower speed wheel.

To begin operation of the system, the program then advances to block 304 to determine whether or not a sufficient time period has elapsed during which slip has occurred. If insufficient time has elapsed, program block 306 simply increments the counter and begins the process over again. If sufficient time has elapsed, the program advances to block 308 which scans the various signal conditions which might disqualify the vehicle for operation of the slip control system. If however, the vehicle qualifies for slip control, the program advances to a selected one of the bands 310, 312, 314, 316 and 318. Assuming that a slip condition is first determined and that the time has elapsed, the vehicle can only enter the slip control mode via band 5. In other words, the ratio of the high speed wheel rate to the low speed wheel rate must be 1.7 or greater. However, as hereinafter described, the vehicle preferably exits the control mode by sequencing through the lower bands 4 through 1 which produces a smooth transition back to the uncontrolled mode.

Assuming that the vehicle enters band 5 through program block 318 and that a positive indication is reached in the next program block 286, the brake force is periodically incremented upward by reducing the brake hold-off pressure as indicated in program block 294 by the increment X (psi) for every timing cycle until the slip value qualifies the program for entry into another band. This is indicated in FIG. 8 where the first step from the hold-off pressure of 400 psi represents an abrupt drop to 200 psi and three additional incremental drops of approximately 33 psi so as to increase the parking brake force through spring action with each increment.

After the first large pressure drop and the three incremental pressure drops, the slip condition is shown to enter band 4; i.e. the slip has been reduced to the point where the value is <1.7 and ≧1.5. In this condition program blocks 320 and 322 cause the braking force to be increased by a smaller increment Y (psi) for every timing cycle. Thus, the system approaches the full brake force condition in a gradual curve since the increments of pressure increase become smaller as the full brake force condition is approached.

As lower slip values are reached, the system qualifies itself for successive entry into bands 3, 2 and 1. This causes gradually increasing brake hold-off pressure through progressively larger incremental steps and corresponding reduction in the brake force until the system returns to the condition when the brakes are completely disengaged. This uncontrolled condition is a full hydraulic brake pressure of 400 psi. To this end band 3 is the mirror image of band 4 and causes incremental reductions in brake force through incremental increases in brake hold-off pressure. Band 2 is the mirror image of band 5 and causes larger (X) incremental reductions in brake force. Band 1 has no counterpart and causes substantially large reductions in brake force as represented by the increment W in FIG. 8.

FIG. 1 is a schematic diagram of the hydraulic system for the apparatus. Hydraulic pressure is provided by a pump 49 through a conduit 50. The hydraulic pressure is supplied to the emergency/parking brake valve 51 which is illustrated in greater detail in FIG. 3. The valve 51 is actuated by air under pressure via conduit 53 from a control valve (not shown). The emergency/parking brake valve actuates the brakes 15, 15' by venting the pressure of the hydraulic fluid into a drain line 52. Since the brakes 15, 15' are spring engaged, any decrease in the hydraulic pressure to them causes them to engage and apply a braking force to the wheels 8, 9.

FIG. 3 illustrates the emergency/parking brake valve 51 in detail. The control of fluid flow through conduit 54 and the resulting pressure of this fluid is controlled by the application of pressurized air to the valve via conduit 53. The parking brake valve includes a valve spool 56 that is resiliently urged to the left as illustrated in FIG. 3 by spring 57. The spring is housed within a hollowed-out bore 58 and is held in place by means of a removable plug 59. The spool also includes a reduced diameter portion 61 which resides between two lands 62, 63. In the reduced diameter portion 61 of the valve spool is a restricted radial passage 68 that communicates with an axial passage 69 and an axial chamber 70 located behind the valve spool.

The parking brake valve 51 also includes a housing block 64 which contains spaced apart passageways 65, 66. Passageway 65 communicates with a drain sump through conduit 52. Passageway 66 communicates with the hydraulic pump 49 through conduit 50.

The valve spool 56, FIG. 3 is provided with a co-axial rod 72 which resides in a chamber 73 formed in a bolted-on housing, shown generally at 74. The rod 73 has a foot that engages a resilient diaphragm 75 that is adapted to flex within a second chamber 76 formed in the housing 74. The chamber 76 communicates with a source of air under pressure via conduit 53. The air pressure is controlled by a manually-operated emergency valve (not shown) and a parking brake valve (not shown).

It should be noted in FIG. 3 that by virtue of the radial restricted passage 68 and the axial passage 69 in the valve spool 56, the fluid pressure in outlet conduit 54 is constantly communicated to the chamber 70 wherein it acts upon the end portion of the valve spool. This pressure is in opposition to the pressure in the air chamber 76 and in concert with the biasing force of the spring 57. When the force exerted by the fluid in chamber 70 upon the valve spool 56 becomes greater than the force exerted upon the spool by the diaphragm 75, the spool will move leftward to a position blocking communication between the outlet conduit 54 and the fluid inlet passage 66.

When the valve spool 56 is positioned as shown in FIG. 3, conduit 54 and thus the entire brake system are vented to drain via the passageway 65 and the drain conduit 52. When conduit 54 is vented to a drain, both brakes 15, 15', FIG. 1 are engaged and a braking force is applied to the wheels 8, 9.

Referring to FIGS. 1 and 3, during normal vehicle operation the air pressure from the emergency/parking brake control valves (not shown) in conduit 53 is at a maximum. This pressurized air in the air chamber 76 acts against the diaphragm 75 to move the spool valve 56 to the right, blocking communication between the outlet conduit 54 and the drain passage 52. Concurrently the spool valve 56 establishes communication between the fluid under pressure in pump conduit 50 and the outlet conduit 54. The resulting hydraulic pressure in the outlet conduit 54 causes the emergency/parking brakes to be disengaged when the slip control system is not actuating them.

Referring to FIG. 1 the hydraulic pressure communicated through the parking brake valve 51 is directed to the selector valve 28, FIG. 1, through conduit 54'. Further, the pressure in conduit 54 is communicated to the modulating control valve 29 and the single spool reducing valve 30 through conduits 54" and 79. conduit 54" contains a fixed orifice 78 which provides a pressure drop in conduit 54" and 79 downstream of orifice 78 whenever there is flow in conduit 54" and also prevents the control valve 29 from bleeding all of the pressure from conduit 54 and thereby actuating the brakes through conduit 54'.

As illustrated in FIG. 1, the modulating control valve 29 is a variable orifice valve that is actuated by the pulse width modulated servo valve driver 37 described above in connection with FIG. 2. The variable control orifice brings conduit 79 into communication with the drain line 80 and modulates the reducing valve 30 in the manner proportional to the difference in rotational speed between the wheels 8, 9. The function of the variable control orifice is to vary the pressure in conduit 79 by predetermined amounts by venting off the pressure therein into the drain. The opening and closing of the orifice is controlled by the valve driver 37 in accordance with the command signals from the electrical control circuit 24.

The single spool reducing valve 30, FIG. 1, is illustrated in detail in FIG. 4. The parking brake valve 51 and the hydraulic pump 49 are connected to the reducing valve through supply conduit 54'''. The pressure in the conduit 79 modulates the reducing valve 30 and the valve 30 is connected to the selector valve 28 by output conduit 82. The valve 30 is also connected to drain via a conduit 83.

Referring to FIG. 4, the single spool reducing valve 30 includes a spool 85 having a central reduced diameter portion 86, a land portion 87 and a land portion 88. The spool 85 slides back and forth within a bore located in a valve body 89. The left-hand end of the spool 85 contains a reduced diameter portion 90 which is fitted with a compression spring 91. The spring 91 engages the end of the bore and urges the spool 85 rightwardly. The rightward motion of the spool 85 is arrested by a stop 92 mounted on a plug 93 which seals the bore in which the spool 85 slides.

Referring to FIG. 4, the reduced diameter portion 90 of the spool valve 85 contains a damper assembly 95. The damper assembly includes a cylindrical slug 96 which resides within a bore 97 in the left-hand end of the spool 85. A retainer 98 positions a check valve in bore 97 to define a chamber 99 in the land portion 88 of the spool 85. The chamber 99 communicates with the bore 97 through an axial passageway 101 which is along the center line of the spool valve and a second, substantially smaller axial passageway 102 which is displaced radially from the center line passageway 101. The chamber 99 houses a ball 104 which is urged against the center line axial passageway 101 by a spring 105. The ball 104 and spring 105 form a check valve that can block the center line axial passageway 101. The ball, however, does not block the off-center axial passageway 102. The chamber 99 communicates with the fluid surrounding the reduced diameter portion 86 of the spool valve through an inclined passageway 106 and an axial passageway 107 which connects to a radial passageway 108.

The purpose of the damper assembly 95, FIG. 4, is to retard and damp the motion of the spool 85 when it moves from left to right. The slug 96 engages the end wall of the bore and the pressure of the fluid between the right-hand end of the slug 96 and the retainer 98 is slowly vented through the passageways 101,102. The damper prevents the pressure in parking brake valve conduit 54''' from being suddenly communicated into the selector valve conduit 82.

During operation, referring to FIGS. 1 and 4, the modulating control valve 29 opens and shuts as commanded by the electrical control circuit 24. As the variable orifice shuts, the hydraulic pressure in conduit 79 tends to increase since the fluid in that line is not vented to the drain line 80. Thus, the pressure drop across the fixed orifice 78 is reduced and the pressure in conduit 79 approaches the pressure in conduit 54'''. The pressure in conduit 79 is directed to the right-hand end of the spool 85 and tends to move the spool 85 from right to left. This raises the pressure in conduit 82. FIG. 4 shows the valve 30 when the pressure in conduit 79 is at its highest and the spool 85 is pushed against the end of the bore. In this position the hydraulic pressure in conduit 54''' is communicated by the reduced diameter portion 86 of the spool 85 into conduit 82 and on to the selector valve 28.

When the modulating control valve 29, FIG. 1, opens, the hydraulic fluid in conduit 79 is vented through conduit 80 into the drain. The pressure drop across the fixed orifice 78 increases and the pressure in conduit 79 decreases. This decrease in pressure causes the spool 85 to move to the right under the urging of the spring 91. The rightward motion of the spool 85 tends to block the hydraulic pressure in supply conduit 54''' and to bring the output conduit 82 into communication with the drain conduit 83. In this position, the hydraulic pressure in the conduit 82 is decreased, and this decrease in turn causes the selected brake to engage.

Referring to FIG. 1, the output from the parking brake valve 51 is connected to the selector valve 28 by conduit 54'. The output from the single spool reducing valve 30 is connected to the selector valve by conduit 82. The selector valve 28 is a two-position solenoid actuated valve. The valve 28 is actuated by the solenoid driver 38 from signals from the electrical control circuit 24 described above. When the solenoid driver 38 is deenergized, the selector valve connects conduit 54' to conduit 17 leading to the brake 15 for the right wheel 8. The selector valve also connects conduit 82 to conduit 18 which leads to the brake 15' on the left wheel 9. When the solenoid driver 38 is energized, the selector valve moves to reverse this connection, i.e., conduit 54' is connected to conduit 18 and conduit 82 is connected to conduit 17.

Industrial Applicability-Embodiment of FIGS. 1-4

The operation of the embodiment illustrated in FIG. 1 begins by the two transducers 20, 21 measuring the rotational speeds of the right and left wheels 8, 9. The speed signals from these transducers are compared with the speed of the drive shaft 10 measured by the transducer 25. The electrical control circuit 24 determines if one of the wheels has lost traction and, if so, applies a braking force to the spinning wheel so that the opposite wheel can pull the vehicle forward. The electrical circuit generates two signals: one signal positions the modulating control valve 29 and the other signal positions the selector valve 28. The selector valve 28 determines which brake, 15 or 15', is applied and the control valve 29 determines the amount of braking pressure that is applied to the selected wheel 8 or 9.

More specifically, the hydraulic pump 49, FIG. 1, provides fluid pressure through supply conduit 50 to the parking brake valve 51. The parking brake valve 51, during normal operation, sits with the spool 56, FIG. 3, in the rightward position. The spool 56 resides in this position because the air pressure in conduit 53 is sufficiently large to overcome the spring 57 pressure urging the spool 56 to the left. In this position, the hydraulic pressure in the supply conduit 50 is communicated past the reduced diameter portion 61 of the spool 56 and into the output conduit 54. The drain conduit 52 is blocked by the land portion 62 of the spool 56.

If it is desired to apply the parking or emergency brakes, the air pressure in conduit 53, FIGS. 1 and 3, is decreased sufficiently so that the spool 56 moves to the left and output conduit 54 is brought into communication with the drain conduit 52. In this position all of the conduits 54, 54', 54'', 54''', 82, 17 and 18, leading to the brakes 15, 15' are vented, and the brakes are applied equally to both wheels. The supply conduit 50 from the hydraulic pump 49 is blocked by the land portion 63 of the spool 56.

Referring to FIG. 1, the high pressure fluid in the supply conduit 54 is directed directly to the selector valve 28 via input conduit 54'. In the other input conduit 82, the pressure of the fluid may be varied in a manner proportional to the magnitude of the wheel slippage by the operation of the reducing valve 30 and the modulating control valve 29. More specifically, the high pressure fluid in conduit 54 is directed to the reducing valve 30 through supply conduit 54'''. In addition, high pressure fluid from the parking brake valve 51 is directed to the fixed orifice 78 and in turn to a variable control orifice of valve 29 via conduit 79. The variable control orifice decreases the pressure in conduit 79 by venting this conduit to the drain through conduit 80. The fixed orifice 78 provides the point at which the pressure drop occurs and also prevents the variable orifice from draining off an excessive amount of pressure from line 54'.

Referring to FIG. 4, as the pressure in conduit 79 decreases, the spool 85 moves to the right and less of the pressure in conduit 54''' is communicated to the selector valve 28 via the output conduit 82. In other words, as the control valve 29 vents conduit 79, the pressure in supply conduit 82 decreases. As the variable control orifice of valve 29, FIG. 1, shuts, the pressure in conduit 79 rises and forces the spool 85, FIG. 4 in a leftward direction against the urging of the spring 91. Conduit 54''' is brought into communication with conduit 82, and the pressure in conduit 82 increases to its maximum.

If no slip control is required, then the hydraulic pressure from the parking brake valve 51 is directed through the reducing valve 30 without reduction, and the pressure in conduit 82 equals that in conduit 54'. These equalized pressures are communicated through the selector valve 28 to the brakes 15, 15' to maintain the brakes in the disenagaged position.

If spin control is required, the control valve 29 is opened by an amount dictated by the electrical control circuit 24. The electrical control circuit also positions the selector valve 28 so that the slipping wheel receives the braking force. The control valve 29 modulates the reducing valve 30 by varying the pressure in conduit 79. This in turn varies the fluid pressure in conduit 82 and applies a braking force to the selected wheel 8 or 9.

Embodiment of FIGS. 5 and 6

FIG. 6 illustrates a second embodiment of the present invention. The components which bear the same numbers as the embodiment of FIG. 1 are constructed and operate in the same manner as described above. This second embodiment utilizes a double spool reducing valve 110 and a three-position selector valve 111. There is a valve spool in the reducing valve that is associated with each brake, 15, 15' via conduits 17 and 18. The selector valve 111 is used to connect the modulating control valve 29 to the appropriate spool of the reducing valve 110.

It is believed that the embodiment of FIG. 6 responds faster than the embodiment of FIG. 1, and, in addition, the selector valve 111 is not exposed to high fluid flow rates as is the selector valve 28.

The electrical control circuit 24', FIG. 6 operates in substantially the same manner as described above and is illustrated in FIGS. 7A and 7B. One change, however, is that the microprocessor 32 operates the selector valve 111 through two solenoid drivers 38,113 FIG. 2. If no slip compensation is desired, the solenoid drivers 38,113 are not energized and the selector valve 111 remains in the center position as illustrated in FIG. 6. Conduits 116 and 117 are cross connected and the pressure in both conduits is equalized. If a braking force is required on the right wheel 8, solenoid driver 113 is energized by the microprocessor 32 and the selector valve 111 moves to the right. Conduit 116 is thereby connected to the modulating control valve 29 via conduit 115 and the double spool reducing valve 110 reduces the pressure in conduit 17 which in turn causes the application of a braking force to the right wheel 8. If a braking force is required for the left wheel 9, solenoid driver 38 is energized and the selector valve 111 moves to the left. In this position the selector valve 111 connects conduit 117 to the control valve 29 via conduit 115 and the reducing valve 110 reduces the hydraulic pressure in conduit 18 which in turn applies the braking force to the left wheel 9.

Referring to the hydraulic schematic diagram FIG. 6, the output conduit 50 from the hydraulic pump 49 is connected to a pilot pressure conduit 50' which actuates a ball check valve in the reducing valve 110 described below. The pump output conduit 50 is connected to the parking brake valve 51 which is illustrated in FIG. 3 and described above. The output from the parking brake valve is connected to conduit 54 and the reducing valve through supply conduit 54'''. Hydraulic pressure is also directed into conduits 118 and 119 which connect to modulation conduits 116 and 117. Conduit 118 contains a fixed orifice 120, and conduit 119 contains a fixed orifice 121. These fixed orifices provide a point of pressure reduction so that the spools in the reducing valve 110 are actuated by a pressure substantially less than the output pressure from the hydraulic pump 49. These fixed orifices also prevent the modulating control valve 29 from bleeding all of the pressure from the system. Conduit 54 is connected to conduit 123 which in turn is connected to conduit 80 and the drain conduit 124. Conduit 123 contains a ball check valve 125 which is closed during normal operation by the output pressure from the hydraulic pump acting on the left-hand side of the valve 125. When the system is depressurized, the ball check valve 125 permits conduit 80 to drain through conduit 54, the parking brake valve 51 and drain conduit 52.

FIG. 5 illustrates the double spool reducing valve 110 during normal operation. It should be noted that this valve contains two opposing spools 85, 85' which are constructed and operate in the same manner as the single spool reducing valve 30 described above and illustrated in FIG. 4. For brevity the details need not be repeated.

The hydraulic fluid from the hydraulic pump is supplied to the reducing valve 110, FIG. 5, though supply conduit 54'''. This conduit connects to a manifold 127 which distributes the fluid to two pump ports 128, 129. As shown in FIG. 5, the pump ports 128, 129 communicate with the brake ports 130, 131 across the reduced diameter portion 86, 86' of the spools 85,85'. The brake ports 130,131 connect to the brakes 15, 15', FIG. 6 via conduits 17, 18. When the valve spools 85, 85' move apart, the land portions 88, 88' of the spools 85,85' block the pump ports 128,129 and the brake ports 130, 131 communicate with the drain ports 132, 132'.

Referring to FIG. 5, the double spool reducing valve 110 also includes a pressure actuated ball check valve which seals the drain conduit 124 and is connected to the modulating control valve 29, FIG. 6, via the drain conduit 80. The valve includes a plunger 134 which has an axial extension 135 which engages a ball 139. The plunger 134 slides back and forth within a central bore 136 in the body of the reducing valve 110. The plunger 134 is subjected to the output pressure from the hydraulic pump 49, FIG. 6, via the pilot pressure conduit 50'. This hydraulic pressure urges the plunger 134 in a rightward direction against the ball 139. The extension 135 passes through a passage 137 in the seat 138. The ball 139 is urged against the extension 135 and in a leftward direction by a compression spring 140 which engages a retainer 141 that contacts the ball 139. The rightward motion of the ball 139 and the plunger 134 is arrested by a slug 142 which bears against the end wall of the valve body. The ball 139, retainer 141, spring 140 and slug 142 are retained within a cylindrical sleeve 144 having an end wall which is the seat 138 for the ball 139. Hydraulic fluid from the drain ports 132, 132' passes into the sleeve 144 through a plurality of ports 145 in the side walls of the sleeve 144. The fluid thereafter flows through the passage 137 into the bore 136 containing the plunger 134 and thereafter into the drain conduit 124.

During normal operation the plunger 134 and the ball 139 are positioned as illustrated in FIG. 5. The plunger 134 is urged in the a rightward direction by the hydraulic pressure in conduit 50'. The ball 139 rests against the retainer 141 which is stopped by the slug 142. The hydraulic fluid in the drain ports 132, 132' and in the drain conduit 80 passes through the ball check valve and to the hydraulic sump via drain conduit 124. When the hydraulic pump 49 is not running and conduit 50' is de-pressurized, the spring 140 urges the ball 139 in a leftward direction until the passage 137 is sealed by the ball 139. The ball check valve prevents the hydraulic fluid in conduits 17 and 18 from draining completely into the sump via conduit 124.

Industrial Applicability - Embodiment of FIGS. 5 and 6

During normal operation, the hydraulic pump 49, FIG. 6, provides hydraulic pressure through conduit 50 to the parking brake valve 51. This pressure is passed through the valve to conduit 54 and thereafter directed into conduits 54''', 123, 118, and 119. The hydraulic fluid in conduit 54''' is used to supply the two spools 85, 85' illustrated in FIG. 5. The pressure in conduit 123 shuts the ball check valve 125. The hydraulic fluid in conduits 118 and 119 is directed into the reducing valve 110 via modulating conduits 116 and 117. The hydraulic pressure in conduits 116, 117 urges the spools 85, 85' together against the center wall of the valve 110 and against the pressure of the compression springs 91, 91'. In this position the fluid in the pump ports 128, 129 passes around the reduced portions 86, 86' of the spools 85,85' and into the brake ports 130, 131. From the brake ports the hydraulic pressure passes through conduits 17, 18 to the brakes 15, 15', FIG. 6, causing the brakes to disengage.

If the emergency parking brake, FIG. 6, is applied, the hydraulic pressure in conduit 54 is directed by the brake valve 51 to the drain via conduit 52. The decrease in pressure in conduit 54 causes a corresponding decrease in pressure in conduits 118, 119, 116, and 117. Referring to FIG. 5, the decrease in pressure in conduits 116 and 117 causes the spools 85, 85' to move apart and to come to rest against the stops 92, 92'. The pump ports 128, 129 are blocked and the hydraulic pressure in brake conduits 17 and 18 is vented into the drain ports 132, 132', thus actuating both brakes 15, 15' together.

When an anti-spin braking force is applied to the right wheel 8, FIG. 6, the electrical control circuit 24' energizes the servo valve driver 37 to open the modulating control valve 29 a predetermined amount. The electrical control circuit 24' also energizes the solenoid driver 113, FIG. 6, and the selector valve 111 moves to the right. This connects conduit 116 to the modulating control valve 29 via conduit 115 and the hydraulic pressure in conduit 116 is vented into the drain conduit 80 and in turn to the drain conduit 124. The hydraulic pressure in conduit 119 is passed directly to conduit 117. The spring 91', FIG. 5, urges the left spool 85' in a leftward direction toward the stop 92'. Since the pressure in conduit 117 remains constant, the right spool 85 remains stationary in the position illustrated in FIG. 5. The left spool 85' blocks or partially closes the pump port 129 and the hydraulic pressure in brake conduit 17 is vented into the drain port 132' and in turn into the drain conduit 124. When the hydraulic pressure in brake conduit 17 decreases, the brake 115 is actuated by springs (not shown) and a braking force is applied to the right wheel 8. No braking force is applied to the left wheel 9 because the pressure in conduit 18 remains constant.

The electrical control circuit 24' commands various braking forces depending on the magnitude of the slip. The circuit follows the program illustrated in FIGS. 7A and 7B. The control valve 29 is opened and shut in predetermined amounts so that the reducing valve 110 is modulated and the pressure in the brake conduits 17, 18 is varied in correspondence with the slip.

When the electrical control circuit 24', FIG. 6, stops applying a braking force to the right wheel 8, the solenoid driver 113 is de-energized and the selector valve 111 moves to the central position as illustrated in FIG. 6. In this position, conduits 116 and 117 are cross-connected and the left spool 85' moves in a rightward direction to block the drain port 132' and to connect the pump port 129 to the brake port 131 and conduit 17. When conduit 17 is again pressurized, the brake 15 on the right wheel 8 is disengaged. At this point the valve spools 85, 85' are again positioned as illustrated in FIG. 5.

If a braking force is applied to the left wheel 9 by the electrical control circuit 24', the servo valve driver 37 is energized to open the modulating control valve 29 a predetermined amount. In addition, the solenoid driver 38 is energized and the selector valve 111 moves in a leftward direction. Conduit 117 is connected to the control valve 29 via conduit 115 and conduit 116 is blocked so that hydraulic pressure from conduit 118 is passed directly into conduit 116. Referring to FIG. 5, the left-hand spool 85' remains in the position shown and the right-hand spool 85 moves to the right due to the decrease in hydraulic pressure in conduit 117 and the urging of the spring 91. The right spool 85 blocks the pump port 128 and the hydraulic pressure in the brake conduit 18 is vented into the drain port 132. Thus, the hydraulic pressure in conduit 18 is reduced and a braking force is applied to the left wheel 9 by the brake 15'. The variable application of the brake and the return of the system to its normal operating conditions are substantially the same as described above.

From the foregoing it is apparent that the anti-slip apparatus described herein senses any difference in rotational speed between the driving wheels of a vehicle, such as a truck and develops a slip signal proportional to the difference. This difference is used by the electrical control circuit 24' to apply a stopping force to the slipping wheel in a manner proportional to the difference in rotational speeds between the wheels 8 and 9. The system includes means for actuating the brakes that is modulated by the slip signal so that the magnitude and duration of the braking force corresponds to the amount of slippage of the wheel.

It should be appreciated that while the best mode of the invention utilizes a programmed microprocessor 32, FIG. 2, the programming of which is disclosed above and illustrated in FIGS. 7A and 7B, it is possible to implement the circuit utilizing more traditional hard-wired circuits. For example, slip signal values may be generated by means of tachometer generators and voltage comparators, and the result may be applied to a series of biased comparator amplifiers representing a series of contiguous slip value bands. The outputs of the amplifiers may be summed through conventional logic and applied to a stepper motor, ladder network, or other summing device operatively interconnected with the variable control orifice 29.

It should also be understood that although the embodiments disclosed herein utilize spring actuated brakes that engage when the hydraulic pressure to them decreases, other braking systems can be used such as hydraulically actuated brakes and electric brakes. In these systems the brake pressure is increased in a direct ratio to the magnitude of the slip signal.

The present invention solves the problem in anti-slip control systems of too abruptly applying and releasing braking forces to the slipping wheel. The apparatus and method disclosed herein utilizes a control valve that modulates an actuating valve that is continually varied in a manner corresponding to the amount of slip that is occurring.

Other aspects, objects and advantages of this invention can be obtained from a study of the drawings, the disclosure and the appended claims.

We claim:

1. In an anti-slip apparatus for balancing the power transfer between a pair of driven wheels (8), (9) when one of the wheels loses traction and rotates faster than the other, said apparatus having braking means (15) for braking the wheels (8), (9) and generating means (20), (21), (24) for generating a slip signal corresponding to any difference in the rotational speeds between the wheels (8), (9), wherein the improvement comprises:
    hydraulic actuating valve means (28), (30) for individually actuating said braking means (15) to minimize any rotational speed difference between the wheels (8), (9), said actuating valve means (28), (30) being connected to a source of hydraulic pressure (49) and to said braking means (15); and,
    hydraulic modulating valve means (29) for modulating said actuating valve means (28), (30) in response to the slip signal to proportionally vary the braking force individually applied to the wheels (8), (9) by the actuating valve means (28), (30).

2. An apparatus as in claim 1 wherein said braking means (15) includes a pair of spring engaged, hydraulically released brakes (15), (15') and wherein the valve means (28), (29), (30) includes means (29), (30) for reducing the hydraulic pressure to the brake (15/15') on the faster rotating wheel (8/9) in a manner proportional to the difference in the rotational speed between the wheels (8), (9).

3. An apparatus for controlling wheel slip on differentially driven wheels (8), (9) when one of the wheels (8/9) loses traction and rotates faster than the other, comprising:
    a pair of spring engaged, hydraulically released brakes (15), (15'), said brakes being connected to the wheels (8), (9);
    a source of hydraulic pressure (49);
    generating means (20), (21), (24) for generating a slip signal proportional to any difference in the rotational speeds of the wheels (8), (9);
    pressure reducing valve means (30) for reducing the hydraulic pressure to the brake (15) of the faster rotating wheel;
    a control valve means (29) for modulating the reducing valve means (30);
    selector valve means (28) for connecting the reducing valve means (30) to the brake of the faster rotating wheel, said selector valve means (28) being actuated by the signal generating means (20), (21), (24) and connected to the two brakes (15), (15'); and
    a plurality of conduits (54), (79), (82) connecting the source of hydraulic pressure (49) to the selector valve means (28) and the modulating control valve means (29) and the pressure reducing valve means (30) to the selector valve means (28).

4. An apparatus as in claim 3 wherein the plurality of conduits includes:
    a first conduit (54') connecting the source (49) of hydraulic pressure to the selector valve means (28), said first conduit (54') carrying hydraulic fluid at system pressure;
    a second conduit (54''') connecting the source (49) of hydraulic pressure to the pressure reducing valve means (30), said second conduit (54''') carrying hydraulic fluid at system pressure;
    a modulating conduit (82) connecting the pressure reducing valve means (30) to the selector valve means (28), said modulating conduit (82) carrying hydraulic fluid at reduced pressure; and
    wherein the selector valve means (28) includes means (38) for connecting the modulating conduit (82) to the brake (15) of the faster rotating wheel.

5. An apparatus as in claim 3 wherein the modulating control valve means (29) is a solenoid (37) actuated variable orifice valve, said orifice valve being connected to the pressure reducing valve means (30).

6. An apparatus for controlling wheel slip on differentially driven wheels (8), (9) when one of the wheels (8/9) loses traction and rotates faster than the other, comprising:
    a pair of spring engaged, hydraulically released brakes (15), (15'), said brakes being connected to the driving wheels (8), (9);
    a source of hydraulic pressure (49);
    generating means (20), (21), (24') for generating a slip signal proportional to any difference in the rotational speeds of the driving wheels;
    first valve means (85) for reducing the hydraulic pressure to the brakes (15') of one of the driving wheels (9);
    second valve means (85') for reducing the hydraulic pressure to the brake (15) of the other driving wheel (8);
    a modulating control valve means (29) actuated by the slip signal, said control valve means (29) being connectable to modulate the first and second valve means (85), (85');

selector valve means (111) for connecting on command the modulating control valve means (29) to one of the first and second valve means (85), (85'), said selector valve means (111) being actuated by and connected to the signal generating means (20), (21), (24'); and a plurality of conduits (50), (54), (17), (18), (116), (117), (115) connecting the source of hydraulic pressure (49) to the first and second valve means (85), (85') and connecting the first and second valve means to the brakes (15), (15') and to the modulating control valve means (29) via the selector valve means (111).

7. An apparatus as in claim 6 wherein the selector valve means (111) includes a solenoid (113), (38) operated, three position valve (111) actuated by the generating means (20), (21), (24'), in the first position said three position valve (111) connects the modulating control valve means (29) to the first valve means (85), in the second position it blocks communication of the modulating control valve (29) to both the first and second valve means (85), (85'), and in the third position it connects the modulating control valve means (29) to the second valve means (85').

8. An apparatus as in claim 6 wherein the modulating control valve means (29) is a solenoid (37) actuated variable orifice valve, said orifice valve being connected to the first and the second valve means (85), (85') via the selector valve means (111).

9. An apparatus as in claim 6 wherein the first and second valve means (110) each includes a spool valve (85), (85') the position of which is controlled by the modulating control valve means (29) via the hydraulic selector valve (111), said spool valves (85), (85') actuating the brake (15), (15') on the faster rotating wheel (8), (9) in proportion to the difference in rotational speeds between the wheels (8), (9).

10. An apparatus for a motor vehicle for controlling wheel slip on differentially driven wheels (8), (9) when one of the wheels (8/9) loses traction and rotates faster than the other, said motor vehicle having both a service braking system (16) and a parking/emergency braking system (51), (53), comprising:

a pair of spring engaged, hydraulically released brakes (15), (15'), said brakes being connected to the driving wheels (8), (9);

means (20), (21), (24) for generating a slip signal proportional to any difference in the rotational speeds between the driving wheels;

a source of hydraulic pressure (49);

a plurality of conduits (50), (54), (17), (18);

parking/emergency brake valve means (51) for actuating said brakes (15), (15') said brake valve means (51) being connected to the source of hydraulic pressure (49) and to the brakes (15) by the conduits (50), (54), (17), (18);

pressure reducing valve means (30) for reducing the hydraulic pressure from the parking/emergency brake valve means (51) to the brake (15/15') of the faster rotating wheel to minimize any rotational speed difference between the driving wheels (8), (9), said reducing valve means (30) being connected to one of the conduits (54''') between the brake valve means (51) and the brakes (15), (15'); and a modulating control valve means (29) actuated by the slip signal, said control valve being connected to modulate the reducing valve means (30) in response to the slip signal to proportionally vary the braking force applied to the faster rotating wheel by said reducing valve means (30).

11. A method for controlling wheel slip on driven wheels (8), (9) having fluid actuated brakes (15), (15') when one of the wheels (8/9) loses traction and rotates faster than the other, comprising the steps of:

sensing any difference between the rotational speeds of the driven wheels (8), (9);

developing a slip signal proportional to the speed difference between the wheels (8), (9);

variably actuating the brake (15/15') of the faster rotating wheel (8/9) by varying the level of fluid pressure communicated thereto; and modulating the fluid pressure communicated to the faster rotating wheel (8/9) in response to the slip signal.

12. A method as in claim 11 including the step of:

selectively communicating the varied level of fluid pressure to the brake (15/15) of the faster rotating wheel (8/9) and simultaneously communicating a higher level of fluid pressure to the other wheel (8/9) through a common selector valve (28).

* * * * *